UNITED STATES PATENT OFFICE.

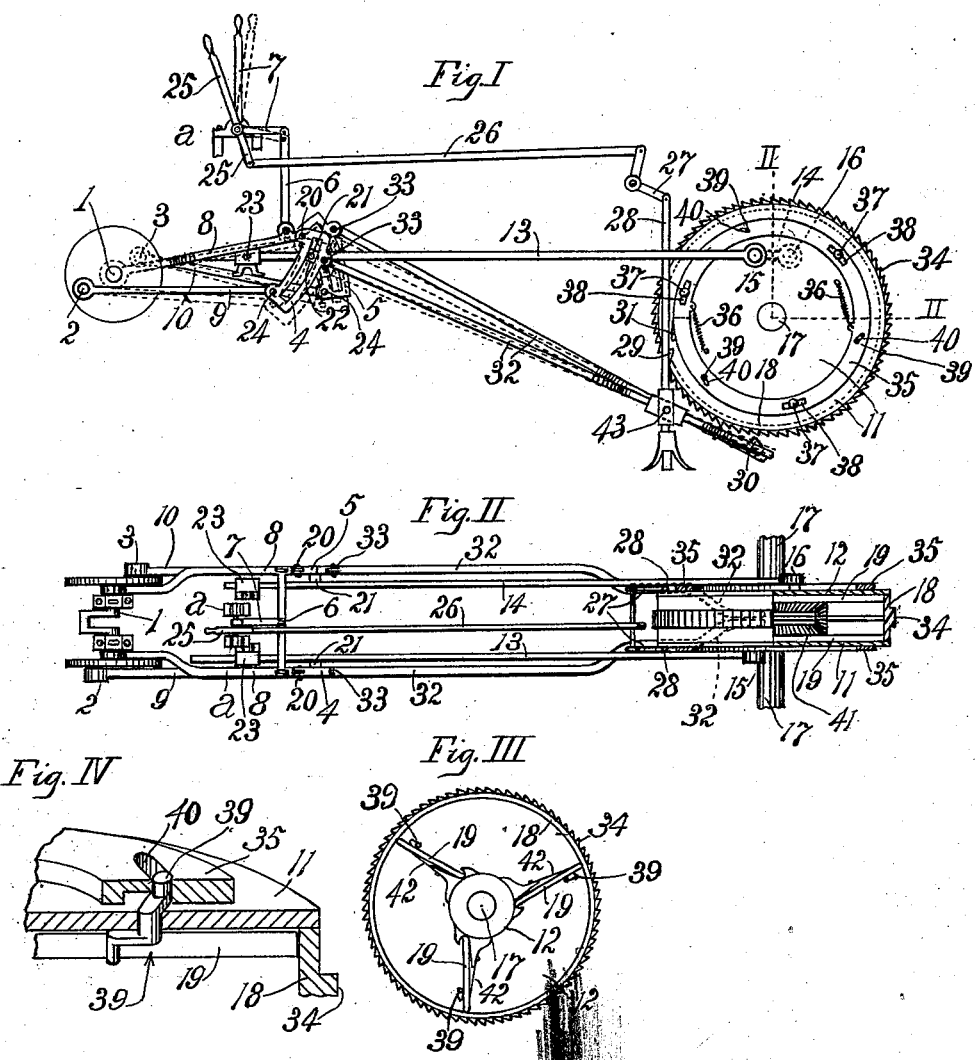

NATHAN WHITE, OF PASADENA, CALIFORNIA, ASSIGNOR TO GEORGIA WHITE, OF PASADENA, CALIFORNIA, AND SOL ROSSEAU, OF SIERRAVILLE, CALIFORNIA.

POWER-TRANSMITTER AND SPEED-CONTROLLER.

SPECIFICATION forming part of Letters Patent No. 692,749, dated February 4, 1902.

Application filed July 17, 1901. Serial No. 68,678. (No model.)

*To all whom it may concern:*

Be it known that I, NATHAN WHITE, a citizen of the United States, residing at Pasadena, in the county of Los Angeles and State of California, have invented a new and useful Power-Transmitter and Speed-Controller, of which the following is a specification.

This invention is applicable for many uses, but is especially designed for use on automobiles.

An object of this invention is to get a variable speed without noise ranging from nothing to full speed.

Another object of this invention is to provide a power-transmitter for automobiles, which is readily reversible, but which will not allow the automobile to back down the hill in case the power is turned off or fails in ascending a hill.

The principle of this invention is that a link movement is employed in connection with means of any suitable construction for converting reciprocating motion into rotary motion, preferably a ratchet or friction clutch. The variation in the speed is produced by increasing and decreasing the length of stroke of the connection which operates the ratchet or friction clutch, and such increase and decrease is accomplished by raising and lowering the links.

In traction devices differential gear is preferably employed to apply the power to the driven shaft.

The accompanying drawings illustrate my invention in a form applicable to an automobile in which the driven shaft on which the traction-wheels are mounted is divided.

Figure I is a side elevation of mechanism embodying this invention. Fig. II is a plan view of said mechanism, the pawl-releasing rings and the differential-gear shell being in section on line indicated by II II, Fig. I. Fig. III is a view of the inside face of one of the shaft-driving members or plates upon which said rings are mounted. Suitable friction-pawls are shown in this view engaging the ratchet rim or shell of the differential gear, the miter-wheels of which are omitted from the view. Fig. IV is an enlarged detail showing in section fragments of a pawl-releasing ring and the plate which carries the same. A friction-pawl and a crank journaled in the plate and operated by the ring to operate the friction-pawl are also shown.

1 indicates a driving-shaft, which will be connected with any suitable motor. (Not shown.) This driving-shaft rotates in either direction indiscriminately so far as the operation of the transmitting mechanism is concerned.

2 3 indicate oppositely-arranged cranks driven by the driving-shaft 1.

4 5 indicate two links to be simultaneously adjusted vertically by a link-controlling rod 6, which is operated by a lever 7, pivoted to a suitable support at $a$. The upper ends of the links respectively are pivoted to connecting-rods 8, which in turn are pivoted coaxially of the shaft 1. The lower ends of the links are respectively connected with the cranks 2 3 by connecting-rods 9 and 10. The greater portion of the device is made up of right and left parts, of which I will now mention two ratchet-driving members or pawl-carrying plates 11 and 12, links 4 and 5, ratchet-driving connecting-rods 13 and 14, and crank-pins 15 16.

The ratchet-driving member or pawl-carrying plate 11 is connected with link 4 by connecting-rod 13, which is pivoted to the plate 11 by the crank-pin 15. The ratchet-driving member 12 is connected with the link 5 by connecting-rod 14, which is pivoted to said plate by the crank-pin 16. The crank-pins 15 and 16 are located equidistant from the shaft 17, upon which the plates 11 and 12 are journaled. It is to be understood that said shaft 17 is divided in the ordinary manner of the driving-shafts of automobiles.

18 indicates the master-wheel or main shell of differential gearing which drives the shaft 17. Said main shell is driven by the pawls 19 of the ratchet-driving members or plates 11 and 12, respectively. These pawls engage the inside of the main shell of the differential gearing.

21 indicates pivot-pins fastened to the connecting-rods 13 14, respectively, and pivoted in sliding blocks 22 in the links 4 5, respectively.

23 indicates pivoted bearing-blocks through which the ratchet connecting-rods 13 14 play.

When the links are in the position shown in the drawings, the movement of the connecting-rods 9 and 10 operate the link as a lever of the second order to cause the connecting-rods 13 and 14 to reciprocate endwise in opposite directions; but if the links were to be lowered, so that the connecting-rods 8 were brought into line with the pin 21, the movement of the links would have no effect to reciprocate the connecting-rods 13 14; but if the links are raised, thus to bring the pivots 20 of the connecting-rods 8 farther away from the pin 21 and the pivots 24 of the connecting-rods 9 and 10 close to the pin 21, the movement of the lower ends of the links will be transmitted to the connecting-rods 13 and 14 to give the ratchet-plates 11 and 12 a greater amplitude of movement. The change from the non-movement to the high movement is by perfect gradations, thus resulting in a perfectly-smooth variation of the speed of the differential gearing, and consequently of the driven shaft 17.

25 indicates the reversing-lever, connected by a connecting-rod 26 with a bell-crank 27 and with two pawl-carrying connecting-rods 28, each of which is furnished with a catch 29.

30 indicates reversing-pawls, two in number, one for each of the links. The catches 29 are rigidly attached to the connecting-rods 28, respectively, and operate upon catches 31, which are carried by rings 35, respectively. Said rings 35 are operatively connected to throw the pawls 19 out of operative position.

In the drawings no attempt has been made to illustrate in detail the differential gearing. It is to be understood that any character of differential gearing will serve the purposes. The shaft-driving members 11 12 are journaled on the shaft 17.

35 indicates loose rings forming virtual extensions of the members 11 12.

36 indicates springs yieldingly connecting the rings 35 with the members 11 and 12, to which they pertain, respectively, and 37 indicates studs passing through slots 38 to limit the movement of the rings 35 on the shaft-driving members 11 and 12, respectively.

39 indicates cranks journaled in the shaft-driving members 11 and 12, respectively, and extending through slots 40 in the rings, respectively, and arranged to engage the pawls 19, respectively, to force them out of contact with the ratchet-rim 34 whenever the rings 35 are moved by the catches 29 for that purpose.

The reversing-pawls 30 are operatively connected with the links 4 and 5, respectively, by connecting-rods 32, which are pivoted to their respective links 4 and 5 by pivots 33, respectively. Each pivot 33 is located at a point on its link to produce a slow motion when the links are in position for no motion of the connecting-rods 13 and 14. This position is indicated by dotted position of rod 32 in Fig. I. The pawls 30 engage a ratchet 34 on the shell of the differential gearing to turn such shell in the direction opposite to that in which it is turned by the operation of the driving members or plates 11 and 12.

41 indicates the miter-gears of the differential gearing.

When the rod 28 is updrawn by the lever 27, the catches 29 catch upon the catches 31 and move the rings 35 against the tension of the springs 36 to operate the cranks 39 to move the pawls 19 against the tension of their springs 42 out of contact with the inside of the shell 18 of the differential gear. The rod 32 is slidingly pivoted to the rod 28 by a pivot 43, fixed to said rod 28. When said rod is uplifted to cause the catches 29 to catch the catches 31, the pawl 30 is brought into position to actuate the ratchet 34 of the shell of the differential gear. At a reverse movement of the rod 28 the springs 36 return the rings 35 to operate the cranks 39 to release the pawls 19 and allow the springs 42 thereof to move said pawls into position to actuate the shell 18 of the differential gear. At the same time the pawl 30 is withdrawn from the ratchet 34, thus leaving the differential gear free to turn in response to the movement of the driving members 11 and 12.

In practice the operator desiring to reverse the motion from a forward to a rearward direction will first operate the lever 7 to lower the links into the position where the reciprocating movement of the rods 13 14 will be *nil*. He will then operate the lever 25, and thereby the rod 28 connected therewith, to reverse the movement of the differential gear, thus producing a slow backward movement of the driven shaft 17.

It is to be observed that it is not essential to the operation of the invention that the appliance be provided with differential gearing.

The master-wheel or shell of the differential gearing constitutes a member to be turned, which is connected with the crank-operated links by two sets of mechanisms for operating in one and the other direction alternately the said member to be turned, means being provided for simultaneously throwing one of said sets of mechanism into and the other out of operation, and vice versa, so that the motion of the links is at will applied to drive in one and the other direction alternately the said member to be turned, and by raising and lowering the links the rate of travel of the member to be turned is increased and decreased with a perfectly smooth motion.

I do not limit my invention to the use of the specific means shown for holding the pawls out of operative position, the cranks 39 being simply shown to illustrate one form of such means; nor do I limit my invention to the means shown for operating the pawl-holding means, the ring 35, the catch 29, and springs 36 and the operating parts connected with said catch being simply shown to illustrate a form of means for operating the pawl-holding means.

What I claim, and desire to secure by Letters Patent of the United States, is—

1. The combination of a driving-shaft furnished with two oppositely-arranged cranks; two links; connecting-rods connecting the cranks and links, respectively; connecting-rods pivoted coaxially of the driving-shaft and pivoted to one end of the links, respectively; a driven shaft; means for converting reciprocating to rotary motion to rotate the driven shaft; and means operatively connecting the links with such motion-converting means, respectively.

2. The combination of a driving-shaft furnished with two oppositely-arranged cranks; two links; connecting-rods connecting the cranks and links, respectively; connecting-rods pivoted coaxially of the driving-shaft and pivoted to one end of the links, respectively; a driven shaft; and reversible means for converting reciprocating to rotary motion, operatively connecting the links and the driven shaft.

3. The combination of a driving-shaft furnished with two cranks; two links; connecting-rods connecting the cranks and links, respectively; connecting-rods pivoted coaxially of the driving-shaft and pivoted to one end of the links, respectively; two ratchet-driving members; ratchet-driving connecting-rods pivoted to the ratchet-driving members, respectively; pivoted bearing-blocks through which said connecting-rods slide; sliding blocks in the links respectively; and pins connecting the sliding blocks with the ratchet-driving connecting-rods, respectively.

4. The combination of a driving-shaft furnished with two cranks; two links; connecting-rods connecting the cranks and links, respectively; connecting-rods pivoted coaxially of the driving-shaft and pivoted to one end of the links, respectively; two ratchet-driving members; ratchet-driving connecting-rods pivoted to the ratchet-driving members, respectively; pivoted bearing-blocks through which said connecting-rods slide, respectively; sliding blocks in the links, respectively; pins connecting the blocks with the ratchet-driving connecting-rods, respectively; and means for raising and lowering the links.

5. The combination of a driving-shaft furnished with two cranks; two links; a connecting-rod connecting one of the cranks with one of the links; a connecting-rod connecting the other crank with the other link; connecting-rods pivoted coaxially of the driving-shaft and pivoted to one end of the links, respectively; a driven shaft; differential gear for driving said driven shaft; a ratchet-wheel on the outer shell of the differential gear; driving members journaled on the driven shaft and furnished with crank-pins, respectively; means carried by said driving members to drive the shell of the differential gear in one direction; slidingly-pivoted connecting-rods connected with the crank-pins of the driving members, respectively; sliding blocks pivoted to said connecting-rods and mounted in said links; pawls operatively connected with the links, respectively, for driving the ratchet-wheel in the other direction; and means for moving the pawls into and out of position for operating the ratchet-wheel.

6. The combination of a driven shaft; differential gearing for driving said shaft; means for turning the master-wheel of the differential gearing in one direction; a master-wheel-operating member journaled coaxially of said shaft; pawls carried by said master-wheel-operating member for turning the master-wheel in the opposite direction; cranks journaled in said member to engage and release the pawls; and means for operating the cranks.

7. The combination of a driven shaft; differential gearing for driving said shaft; means for turning the master-wheel of the differential gearing in one direction; a member journaled coaxially of said shaft; pawls carried by said member for turning the master-wheel in the opposite direction; cranks journaled in said member to engage and release the pawls; a ring mounted on said member and operatively connected with the cranks to turn the same; means for partially rotating the ratchet-operating member back and forth; and means for turning the ring to operate the crank.

8. The combination of a driving-shaft furnished with two cranks; two links; a connecting-rod connecting one of said cranks with one of said links; a connecting-rod connecting the other of said cranks with the other of said links; a connecting-rod pivoted coaxially of the driving-shaft and pivoted to one end of one of the links; a connecting-rod pivoted coaxially of the driving-shaft and pivoted to the other of said links; a driven shaft; differential gearing for driving the driven shaft; a pawl-operating member; a connecting-rod connecting one of the links with said pawl-operating member; pawls carried by the pawl-operating member for turning the shell of the differential gearing in one direction; another pawl-operating member; a connecting-rod connecting the other link with said other pawl-operating member; pawls carried by the pawl-operating member to turn the shell of the differential gearing in one direction; cranks in one of said pawl-operating members to hold its pawls out of operative position; cranks in the other of said pawl-operating members for holding the pawls of said member out of operative position; means on one of said pawl-operating members to operate its cranks; means on the other pawl-operating member to operate its cranks; means for operating said crank-operating means; means connected with one of the links for turning the differential shell in the other direction; means connected with the other link for turning the differential shell in said other direction; and means for throwing said differential shell-turning means into and out of operative position.

9. The combination of two oppositely-arranged cranks; means for simultaneously turning said cranks; two links; means for simultaneously raising and lowering said links; connecting-rods pivoted respectively to said links and coaxially of said cranks; a driven shaft; a ratchet member for driving the driven shaft; two pawl-carrying members for driving the shaft-driving member in one direction; means connecting one of the links with one of said pawl-carrying members to partially rotate the same back and forth; means connecting the other link with the other pawl-carrying member to partially rotate said other pawl-carrying member back and forth; pawls on said pawl-carrying members respectively; means for holding the pawls of one pawl-carrying member out of operative position; means for operating said pawl-holding means; a pawl connected with one of said links and carried by said means for operating said pawl-holding means and arranged to drive the ratchet member in the opposite direction; another pawl connected with the other of said links and carried by said means for operating said pawl-holding means and arranged to drive the ratchet member in said other direction; said last-mentioned pawls being in operative position when the first-mentioned pawls are out of operative position, and vice versa.

10. A motion-transmitting device comprising two crank-operated links; a member to be turned connected with said links by two sets of mechanisms for operating in one and the other direction, alternately, the said member to be turned; said sets of mechanisms; and means for simultaneously throwing one of said sets of mechanisms into and the other set out of operation, and vice versa.

11. A motion-transmitting device comprising two crank-operated links; a member to be turned; means operatively connecting one of said links with said member to turn the same in one direction; means operatively connecting the other of said links with said member to turn the same in said one direction; and means for raising and lowering said links.

In testimony whereof I have signed my name to this specification, in the presence of two subscribing witnesses, at Los Angeles, California, this 11th day of July, 1901.

NATHAN WHITE.

Witnesses:
JAMES R. TOWNSEND,
JULIA TOWNSEND.